United States Patent
Pearl, Jr. et al.

(10) Patent No.: US 11,365,601 B2
(45) Date of Patent: Jun. 21, 2022

(54) DELAYED ACTIVATION OF NO-HEAT LIQUID SOLDER IN A WELLBORE

(71) Applicant: Halliburton Energy Services, Inc., Houston, TX (US)

(72) Inventors: William Cecil Pearl, Jr., Spring, TX (US); Samuel J. Lewis, Spring, TX (US); Simon David Turton, Kingwood, TX (US); Richard F. Vargo, Jr., Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 85 days.

(21) Appl. No.: 16/746,515

(22) Filed: Jan. 17, 2020

(65) Prior Publication Data
US 2021/0222513 A1   Jul. 22, 2021

(51) Int. Cl.
*E21B 33/138* (2006.01)
*E21B 33/14* (2006.01)
*B23K 35/02* (2006.01)

(52) U.S. Cl.
CPC ......... *E21B 33/138* (2013.01); *B23K 35/025* (2013.01); *E21B 33/14* (2013.01)

(58) Field of Classification Search
None
See application file for complete search history.

(56) References Cited

U.S. PATENT DOCUMENTS

| | | | |
|---|---|---|---|
| 4,232,741 A * | 11/1980 | Richardson | C09K 8/94 166/281 |
| 10,266,925 B2 | 4/2019 | Thuo et al. | |
| 2003/0058127 A1 | 3/2003 | Babour et al. | |
| 2004/0104045 A1 | 6/2004 | Larovere | |
| 2006/0037748 A1 | 2/2006 | Wardlaw et al. | |
| 2006/0144591 A1* | 7/2006 | Gonzalez | E21B 33/13 166/277 |
| 2008/0060811 A1* | 3/2008 | Bour | C04B 26/04 166/291 |
| 2009/0229494 A1 | 9/2009 | Shah et al. | |
| 2012/0247765 A1 | 10/2012 | Agrawal et al. | |
| 2015/0198009 A1* | 7/2015 | Bexte | E21B 29/002 166/290 |
| 2016/0137912 A1 | 5/2016 | Sherman et al. | |
| 2016/0258269 A1 | 9/2016 | Musso et al. | |
| 2017/0014958 A1* | 1/2017 | Thou | B23K 35/3013 |
| 2017/0081956 A1 | 3/2017 | Ganguly et al. | |

(Continued)

FOREIGN PATENT DOCUMENTS

WO   2017011029   1/2017

OTHER PUBLICATIONS

Cinar et al. "Mechanical Fracturing of Core-Shell Undercooled Metal Particles for Heat Free soldering" Scientific Reports, Nature; Feb. 2016, pp. 1-10 (Year: 2016).*

(Continued)

*Primary Examiner* — Charles R Nold
(74) *Attorney, Agent, or Firm* — Kilpatrick Townsend & Stockton LLP

(57) ABSTRACT

Metal material coated with a layer that is controllably activated can be positioned downhole in a wellbore prior to performing a wellbore operation. After the wellbore operation is performed, the layer can be activated to release the metal material.

20 Claims, 7 Drawing Sheets

(56) References Cited

U.S. PATENT DOCUMENTS

2018/0258735 A1   9/2018   Shafer
2018/0274333 A1   9/2018   Gibb

OTHER PUBLICATIONS

PCT Application No. PCT/US2020/014155, International Search Report and Written Opinion, dated Oct. 7, 2020, 12 pages.
PCT Application No. PCT/US2020/014159, International Search Report and Written Opinion, dated Oct. 7, 2020, 13 pages.
PCT Application No. PCT/US2020/014161, International Search Report and Written Opinion, dated Oct. 15, 2020, 12 pages.
PCT Application No. PCT/US2020/014164, International Search Report and Written Opinion, dated Oct. 15, 2020, 12 pages.

* cited by examiner

DELAYED ACTIVATION OF NO-HEAT LIQUID SOLDER IN A WELLBORE

TECHNICAL FIELD

The present disclosure relates generally to materials usable in a wellbore environment for completion processes. More specifically, this disclosure relates to metal material that can be controllably released in liquid form after performing wellbore operations.

BACKGROUND

During completion of a well in a subterranean formation, casing may be added to the wellbore and cemented to seal and fix the casing in the wellbore. Perforations in the casing, cement, and formation may also be introduced during completion to enable efficient production of hydrocarbons from the formation.

Aside from cement, other wellbore treatment materials, such as polymers and resins, may be used, for sealing and fixing the casing in place within the wellbore or for other operations associated with completion.

DETAILED DESCRIPTION

Figure 1:
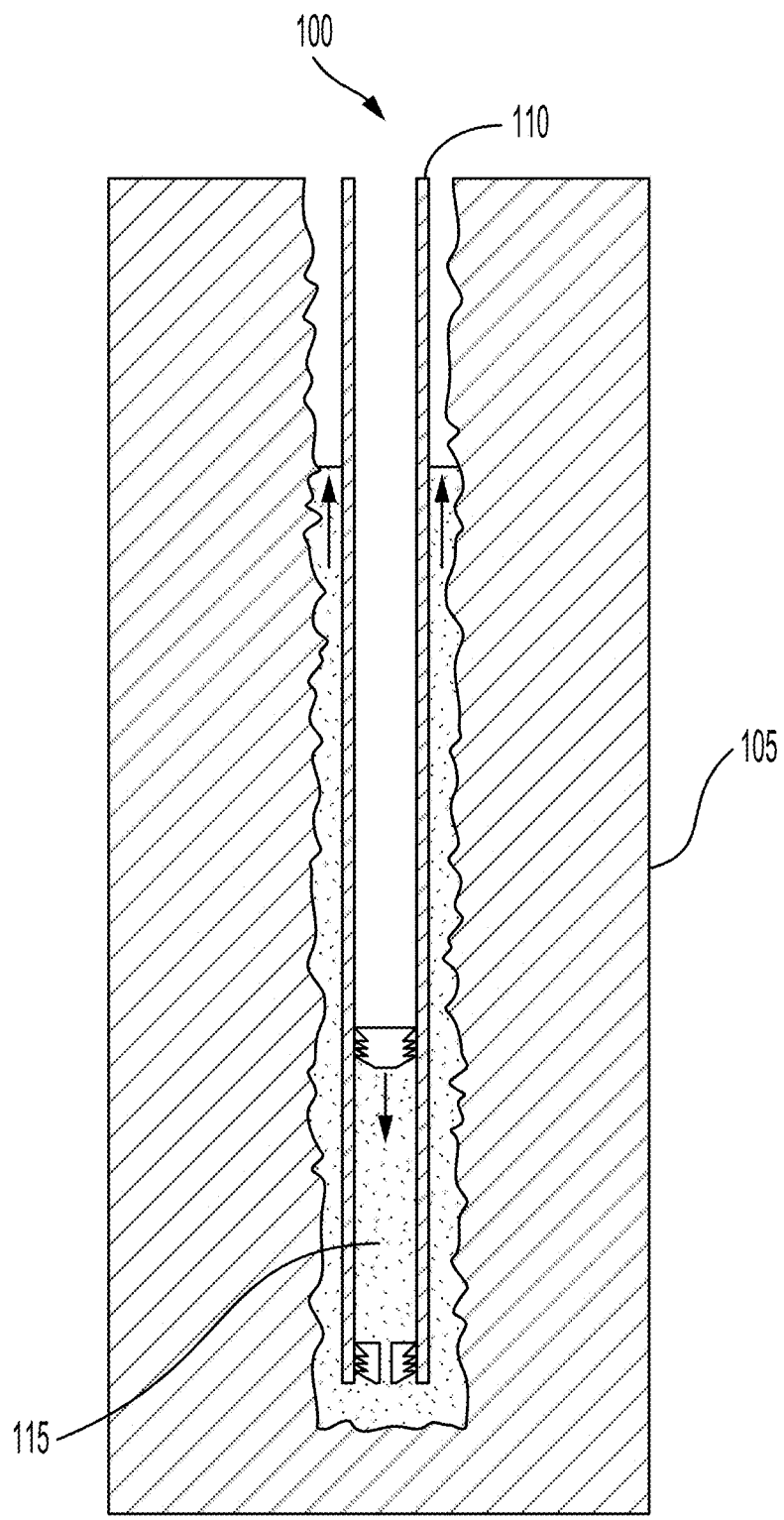
FIG. 1 is a schematic illustration depicting a wellbore completion operation according to one example of the present disclosure.

Certain aspects and examples of the present disclosure relate to wellbore completion using a metal material coated with a layer allowing controlled activation to release the metal material within the wellbore. In some embodiments, the metal material coated with the layer may be positioned downhole in a wellbore and wellbore operations may be performed with the metal material positioned downhole, remaining dormant while the wellbore operation takes place, until the layer is activated. At a desired point in time, such as after completion of a wellbore operation or settling of the metal material, the layer may be activated to release the metal material. Wellbore completion may include processes associated with preparing a well in a subterranean formation for production of hydrocarbons. Examples of preparing the well for production include installing, sealing, or fixing a casing in place within the wellbore using a wellbore treatment material (e.g., cement or resin) or sealing or isolating lost-circulation zones, or repairing casing or cementing when damage, leaks, or other repairable conditions occur. The metal material may comprise a metal or alloy that is in the liquid state prior to activation. The metal material may exist in an undercooled (sometimes referred to as a supercooled) liquid state because the presence of the coating layer can stabilize the metal material in the liquid state below its freezing/melting point. The layer can be controllably activated by breaking, dissolving, or otherwise disrupting the layer to allow the undercooled metal material in the liquid state to be released, after which it can solidify. Example techniques for activating the layer include, but are not limited to subjecting the layer to heat, ultrasonic energy, a magnetic field, an electric field, a compressive stress, a shear stress, or a chemical dissolution treatment.

Metal material coated with a layer that is controllably activated in a wellbore following a completion operation can be useful for forming metal barriers. For example, the metal material coated with a layer that is controllably activated can be pumped into a wellbore and metal shoe seals, liner seals, secondary metallic barriers, or the like can be created by activation of the layer and release of the metal material. In some cases, the metal material may be included in a mixture comprising a carrier fluid, such as a suspension of particles of the metal material in a carrier fluid. Particles of the metal material may have any suitable sizes, such as a diameter of from 3 nm to 10 μm, or any value within this range. The metal material may be allowed to settle out of the carrier fluid, such as by gravity while a wellbore operation is occurring. Following this, a layer of the settled metal material may be activated to release the metal material to form a barrier.

In some examples, the carrier fluid may comprise a spacer fluid, which can be used during cementing of a casing to separate casing cement from drilling mud. The metal material may be allowed to settle out of the spacer fluid, such as by gravity while the cement below the spacer fluid cures, creating a region of settled metal material at the top of the cement. The metal material may be released upon activation of the layer to form a solid metal barrier corresponding to a casing collar at the top of the cement. The position of such a casing collar can be determined using a wireline tool, such as a casing collar locator.

In some examples, a container with metal material coated with a layer that is controllably activated in the wellbore can be placed on a pipe, such as a casing string, and the metal material squeezed out from the container to form a metal barrier. For example, a barrier comprising a ring of solid metal material can be formed at a desired location by activating the metal material as it contacts the pipe. Optionally, the metal material may flow for some distance after being squeezed out from the container before activation of the layer occurs, creating the metal barrier.

In some examples, a metal material coated with a layer that is controllably activated can be pumped into a wellbore and then a casing string can be run into the wellbore. After the casing string is placed in the wellbore, the layer can be activated, releasing the metal material and forming a solid metal barrier that anchors the casing in place within the wellbore.

In another example, a metal material coated with a layer that is controllably activated can be pumped into a wellbore. After a wellbore operation, the layer can be activated to create a metal barrier corresponding to a kickoff plug.

In a further example, a metal material coated with a layer that is controllably activated can be pumped into a wellbore. After a wellbore operation, the layer can be activated to release the metal material and form a solid metal plug for a plug and abandon application. Such a use of the metal material may take advantage of the expansion of the metal material as it solidifies after activation of the layer, forming a good seal in the wellbore, such as for plugging perforations, or isolating various zones in the wellbore.

Example wellbore operation that can be performed while the metal material coated with the layer is at a downhole location in a wellbore include, but are not limited to, running a casing into the wellbore, a cementing operation, a casing perforation operation, running production tubing into the wellbore, a well stimulation operation, a drilling operation, a production operation, or a completion operation.

The metal barriers can be formed using temperature independent processes since the metal material coated with the layer is in an undercooled liquid state prior to release but can be released in liquid state, where it can flow and solidify to the solid state to form the metal. Such a process is different than operations, like welding or thermite, where high temperatures are used. Although activating the layer to release the metal material can be a temperature independent process, heat can be used to facilitate the activation.

FIG. 1 is a schematic illustration depicting a wellbore 100 in which a completion operation is occurring according to one example. Wellbore 100 can extend through various earth strata and can extend through or to a hydrocarbon bearing subterranean formation 105. Although wellbore 100 is depicted in FIG. 1 as substantially vertical, other orientations for sections of wellbore 100 can be used, including curved, angled, or substantially horizontal. Wellbore 100 includes a casing string 110. A mixture 115 is used to fix casing string 110 in place within wellbore 110 as part of a completion operation. As illustrated, mixture 115 is directed downhole within the casing string using a pair of wiper plugs to force mixture 115 into an annular space between the wellbore 100 and the casing string 110.

Mixture 115 can comprise a wellbore treatment fluid, such as a cement slurry, and, optionally, a metal material coated with a layer that is controllably activated within the wellbore 100. In some embodiments, including metal material within mixture 115, aspects of the above features can be achieved, as will be described in more detail below. In some embodiments, a further mixture can be positioned downhole in the wellbore, such as within casing string 110, which can be useful for forming a metal barrier, such as to create a metal shoe seal or a liner seal.

Although FIG. 1 shows a single casing string 110, multiple casing strings can be used within wellbore 100, such as a surface casing string, an intermediate casing string, or a production casing string. In some cases, a liner suspended from inside the bottom of another casing string may be used. Further, various mixtures 115 can be used for wellbore completion operations other than cementing a casing string 110 or for well drilling operations. As examples, resins and polymers may also be used in mixture 115.

The layer coating the metal material in mixture 115 can be activated during the process of fixing casing string 110 in place. For example, heat, ultrasonic energy, magnetic fields, electric fields, compressive or shear stress, or chemical dissolution treatment can be used to activate the layer so that liquid metallic material flows and anchors the casing string 110 in place.

Figure 2:
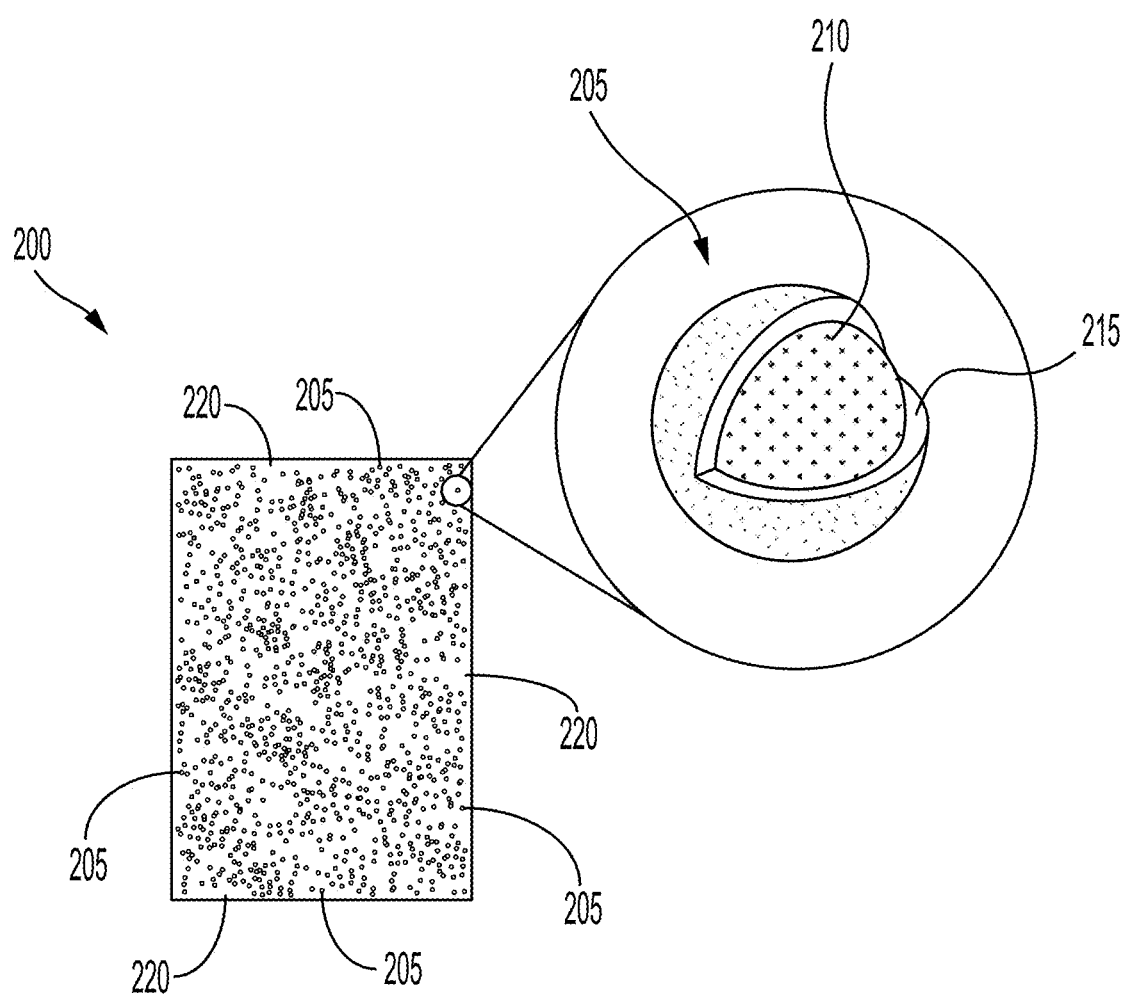
FIG. 2 is a schematic illustration of a mixture comprising a metal material according to one example of the present disclosure.

FIG. 2 is a schematic illustration of a mixture 200 comprising particles 205 of a metal material 210 according to some examples of the present disclosure. Particles 205 may be described as having a core-shell particle structure with metal material 210 corresponding to a core and a layer 215 corresponding to a shell. The particles 205 of metal material 210 may be dispersed in, suspended in, or otherwise supported by a carrier fluid 220, which can be a wellbore treatment material. Metal material 210 may comprise a metal or alloy, in an undercooled liquid state, meaning that the metal material 210 in the particles 205 is a liquid, but is present at a temperature below the melting or solidus temperature of the metal material 210. Any suitable metal or alloy may be useful as the metal material 210, such as those metals or alloys having a melting or solidus temperature of less than about 100° C., less than about 200° C., or less than about 300° C. Optionally, a useful metal or alloy has a melting or solidus temperature greater than the temperature of a subterranean formation. In some examples, useful alloys include, but are not limited to, solder alloys, Field's metal (a eutectic alloy of bismuth, indium, and tin), Wood's metal (a eutectic alloy of bismuth, lead, tin, and cadmium), Cerrosafe (an alloy of bismuth, lead, tin, and cadmium), and Rose's metal (an alloy of bismuth, lead, and tin). Other alloys may be used, such as alloys comprising, consisting of, or consisting essentially of one or more of bismuth, lead, tin, indium, cadmium, thallium, gallium, zinc, copper, silver, gold, or antimony. Eutectic alloys comprising one or more of bismuth, lead, tin, indium, cadmium, thallium, gallium, zinc, copper, silver, gold, or antimony may also be used. Metals and alloys with melting temperatures as high as 500° C. can be used in some embodiments.

As shown in the inset in FIG. 2, the particles 205 of the metal material 210 may include a layer 215, which is schematically depicted in a partial cutaway view to show metal material 210 within layer 215. Layer 215 may be used as a stabilization layer or provide a stabilization effect, allowing metal material 210 to exist in the liquid state at temperatures below a melting or solidus temperature of metal material 210. Layer 215 may comprise one or more of a metal oxide, a chelated stabilizer, an organic adlayer, an inorganic adlayer, or an organic functional group. Example adlayers or functional groups that may be present on a surface of layer 215 may comprise acetate or phosphate. A specific example of layer 215 may comprise a metal oxide, such an oxide of the metal or alloy comprising the metal material 210 (e.g., a self-passivating oxide layer), optionally formed in-situ on the liquid metal material 210. The layer may include a chelated organic stabilizer on the surface thereof, such as a chelated acetate outer shell layer.

Particles of a metal material coated with such a layer may be generated by using a metal droplet emulsion technique. As an example, an amount of a liquid metal at a temperature above its melting or solidus point can be immersed in a dilute acid solution, such as a solution of ~2-5% acetic acid in diethylene glycol, and a rotating implement can be inserted into the mixture and rotated to generate a shearing force that separates small droplets, corresponding to particles 205, of the liquid metal which are coated with an oxide layer with a chelated stabilizing layer. The oxide layer and chelated stabilizing layer can serve to isolate the liquid metal from contacting nucleation sites, trapping the liquid metal in a metastable liquid state. Metals with higher melting temperatures can be used when the solution has suitable properties so that the solution stays in liquid form at the melting temperature of the metal. As examples, polyphenyl ether pump fluid or a variety of ionic liquids can be used, as these materials can have boiling temperatures as high as 500° C. or more. The resultant particles 205 can have any suitable dimensions. For example, particles 205 can have a diameter of from 3 nm to 10 μm, or any value within this range. Optionally, the particles 205 can be removed from the emulsion and concentrated to create large volumes of metal material in the form of particles 205. Optionally, the particles 205 can be suspended or dispersed in carrier fluid 220, which may be the same as the solution in which the particles 205 are created or may be a different fluid.

The layer 215, such as an oxide layer and chelated stabilizing layer, can be controllably activated to allow the metal material 210 inside to be controllably released in a liquid state, from which the metal material 210 can flow and then undergo a transformation to a solid state. Activation of layer 215 may include subjecting layer 215 to conditions that disrupt the oxide or chelated stabilizer, such as through mechanical or physical disruption or chemical or other dissolution. Example techniques for activating or controllably activating layer 215 include, but are not limited to, subjecting layer 215 to heat, ultrasonic energy, a magnetic field, an electric field, a compressive stress, a shear stress, or a chemical dissolution treatment. Advantageously, activation of layer 215 does not require the use of heat to allow metal material 210 to be in the liquid state upon activation, though heat may optionally be used to activate layer 215. Stated another way, since metal material 210 is already in the liquid state within layer 215, by disrupting layer 215, metal material 210 can be released in a liquid state without using heat to melt metal material 210 from a solid state to a liquid state. Further, layer 215 can be activated under ambient conditions or conditions within a wellbore or a formation, to release the metal material 210 in the liquid state.

Mixture 200 may also comprise a carrier fluid 220. For example, carrier fluid 220 may optionally comprise the continuous phase of the emulsion in which the particles 205 are created (e.g., a solution comprising ethylene glycol, an ionic liquid, a polyphenyl ether pump fluid) or another solvent (e.g., water, ethanol, methanol, a liquid hydrocarbon, etc.). Optionally, carrier fluid 220 is itself a mixture. For use in downhole operations in a wellbore, carrier fluid may optionally comprise, for example, an uncured cement or cement slurry, an uncured resin, an uncured polymeric material, a polymer precursor, a drilling mud, a spacer fluid, lost-circulation material, oil-based mud, water-based mud, or the like. Some carrier fluids may cure, change form, or otherwise change state as a function of time, such as curing of a cement to form cured cement, curing of a resin to form cured resin, or curing of a polymeric material or polymerization of a polymer precursor to form a cured polymeric material. In some cases, carrier fluid 220 may facilitate the activation of layer 215, such as by transferring heat, applying stress or strain, or transferring ultrasonic energy, for example.

A concentration of the metal material 210 or particles 205 in mixture 200 may vary depending on the particular application, and concentrations of from 5% by weight to 95% by weight may be used. Other example concentrations (percent by weight) of metal material 210 or particles 205 in mixture 200 include, but are not limited to, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, from 10% to 90%, from 10% to 40%, from 60% to 90%, etc.

In some cases, metal material 210 or particles 205 may settle out of carrier fluid 220, such as over time due to gravity. Metal material 210 or particles 205 may have a density or specific gravity that is higher than that of carrier fluid 220. In such a case, the mixture 200 can have an overall density or specific gravity that is higher than the carrier fluid without metal material 210 or particles 205. In some examples, a specific gravity for mixture 200 may range from 3 to 12. The specific gravity for mixture 200 can be a function of the composition of metal material 210, the composition of carrier fluid 220, and the concentration of metal material 210 in carrier fluid 220, for example.

Figure 3:
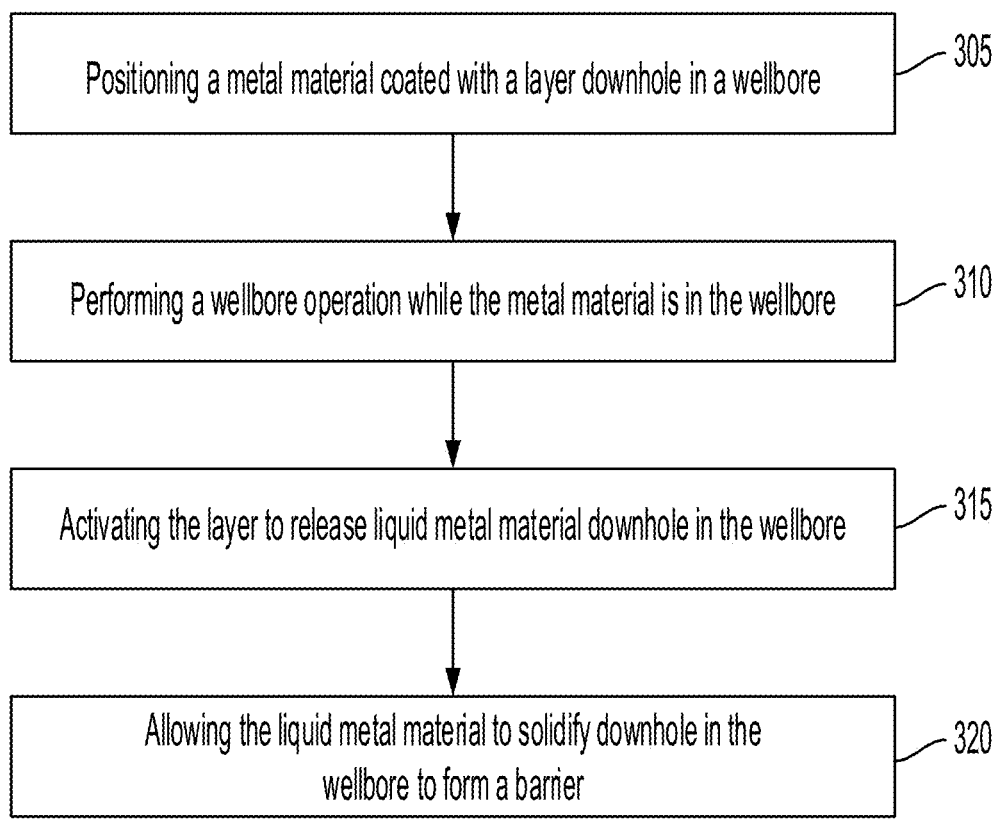
FIG. 3 is a flowchart providing an overview of an example of a method according to the present disclosure.

FIG. 3 is a flowchart providing an overview of an example method according to the present disclosure, such as a method for creating a seal or barrier within a wellbore after a wellbore operation takes place. At block 305, a metal material coated with a layer that is controllably activated is positioned downhole in a wellbore. The mixture may comprise any of the mixtures described herein, such as mixture 115 or 200. The metal material may comprise any metal material described herein, such as metal material 210. The metal material may be in the form of or comprise particles, such as particles 205 in which metal material 210 is coated with layer 215. The metal material coated with the layer may be in a liquid state prior to being positioned downhole in the wellbore. The metal material may be in a mixture, suspension, or dispersion of a carrier fluid, such as a wellbore treatment material. Any suitable wellbore treatment material, such as wellbore treatment materials described herein may be used, such as a cement slurry, a resin, a polymer, a polymer precursor, or the like). The wellbore treatment material or carrier fluid may be used to position the metal material downhole in the wellbore.

At block 310, a wellbore operation is performed while the metal material is in the wellbore. Example wellbore operations include, but are not limited to, running a casing into the wellbore, a cementing operation, a casing perforation operation, running production tubing into the wellbore, a well stimulation operation, a drilling operation, a production operation, or a completion operation. In some cases, the wellbore operation may be or include curing of a wellbore treatment material, such as a cement or resin.

Optionally, the metal material coated with the layer can be allowed to settle prior to activation of the layer. For example, particles of the metal material may settle due to the force of gravity, creating a region with an increased concentration of particles of the metal material. Such a configuration may be useful for locating the metal material at a particular position within the wellbore, such as in a casing shoe, at a top of a cement, etc.

At block 315, the layer can be activated to release the metal material in a liquid state downhole in the wellbore. Activation of the layer can allow liquid metal material to flow out from the layer, such as to fill gaps or voids. As described above, the layer may allow the metal material to exist in a supercooled or undercooled condition in the mixture; that is, the metal material can be in a liquid form even though its temperature is less than the metal material's melting or solidus temperature. Non-limiting examples of activating the layer include subjecting the metal material to one or more of heat, ultrasonic energy, magnetic fields, electric fields, compressive stress, shear stress, or chemical dissolution treatment.

At block 320, the metal material is allowed to solidify downhole in the wellbore, such as to form a barrier comprising solid metal material. Upon activating the layer and releasing the metal material, the metal material can flow, in liquid form, for an amount of time and then the metal material may solidify, such as upon the metal material contacting another substance or object, which may initiate crystallization of the metal material in solid form and create a barrier comprising solid metal material. The process of creating the solid metal barrier can perform, or assisting in performing, a wellbore completion operation, for example, such as fixing a creating a shoe or liner seal, creating a kickoff plug or other plug, creating a casing collar, or creating a casing anchor.

Figure 4:
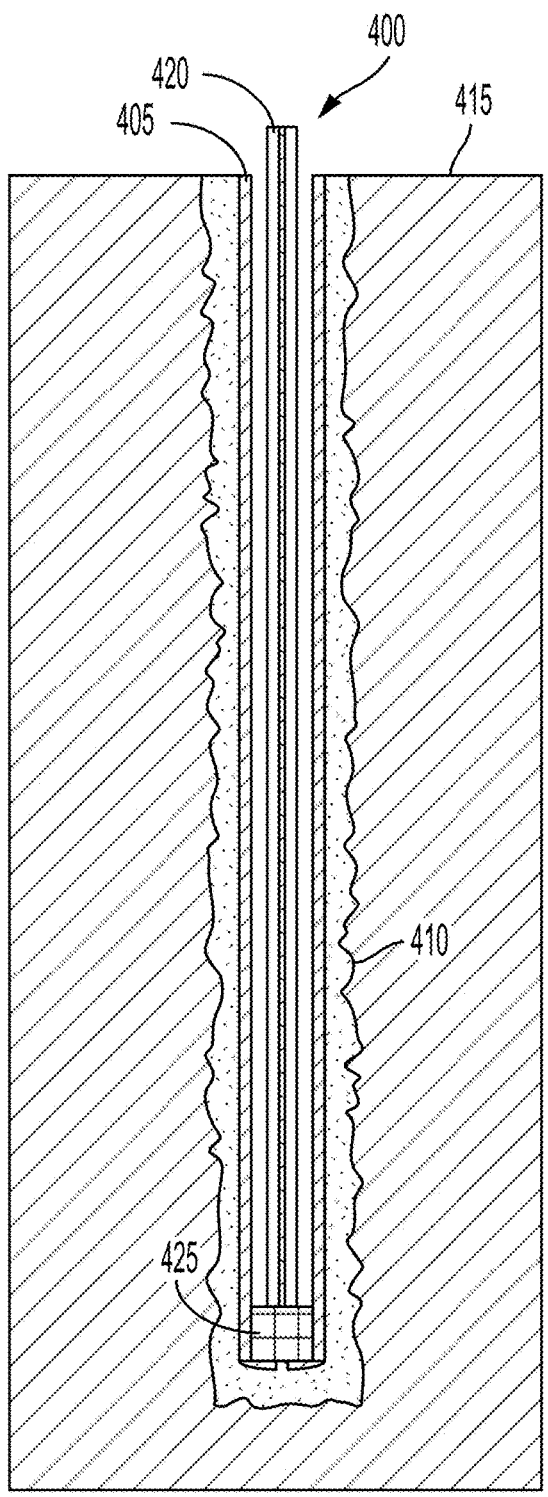
FIG. 4 is a schematic illustration depicting generation of a metal barrier according to one example of the present disclosure.

FIG. 4 is a schematic illustration depicting a wellbore in which a metal barrier is to be formed at a downhole location in the wellbore to provide a shoe seal. FIG. 4 shows a wellbore 400 with a casing string 405 and a cement 410 in a formation 415. A tool string 420 is used to deliver a mixture 425 comprising metal material coated with a layer that is controllably activated at the bottom of the casing string 405. Time may be allowed to pass, such as during which a wellbore operation can take place. The wellbore operation can include, for example, a portion of a cementing operation, such as where cement 410 is allowed to cure. This time can also to allow particles of metal material in mixture 425 to settle at the very bottom of the casing string 405, where activating the layer can release metal material in liquid form at the bottom of the casing string.

Figure 5:
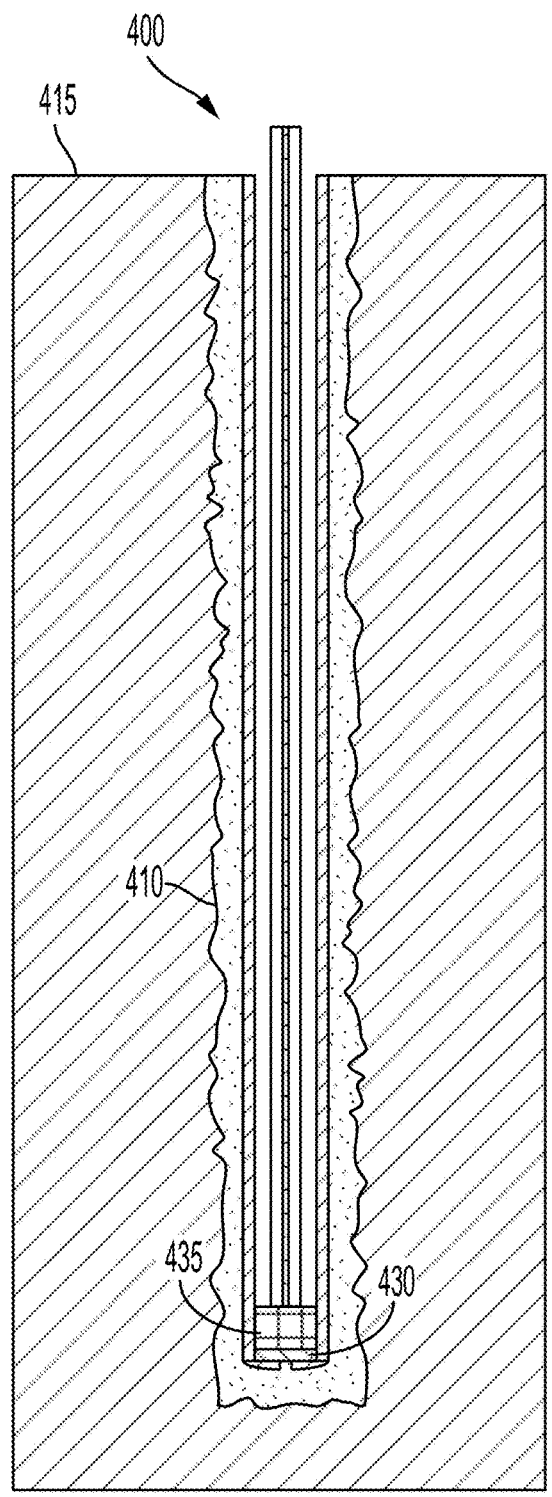
FIG. 5 is a schematic illustration of a wellbore having a metal barrier according to one example of the present disclosure.

FIG. 5 is a schematic illustration depicting wellbore 400 after activation of the layer coating the metal material in mixture 425. As illustrated, the metal material is allowed to flow from the layer and solidify as a metal barrier 430, here corresponding to a shoe seal, comprising solidified metal material. Residual mixture 435 optionally remains above metal barrier 430 and may comprise metal material in which the coating layer remains unactivated, a carrier fluid, or activated layer material from which metal material has been released and has flowed to form metal barrier 430.

Figure 6:
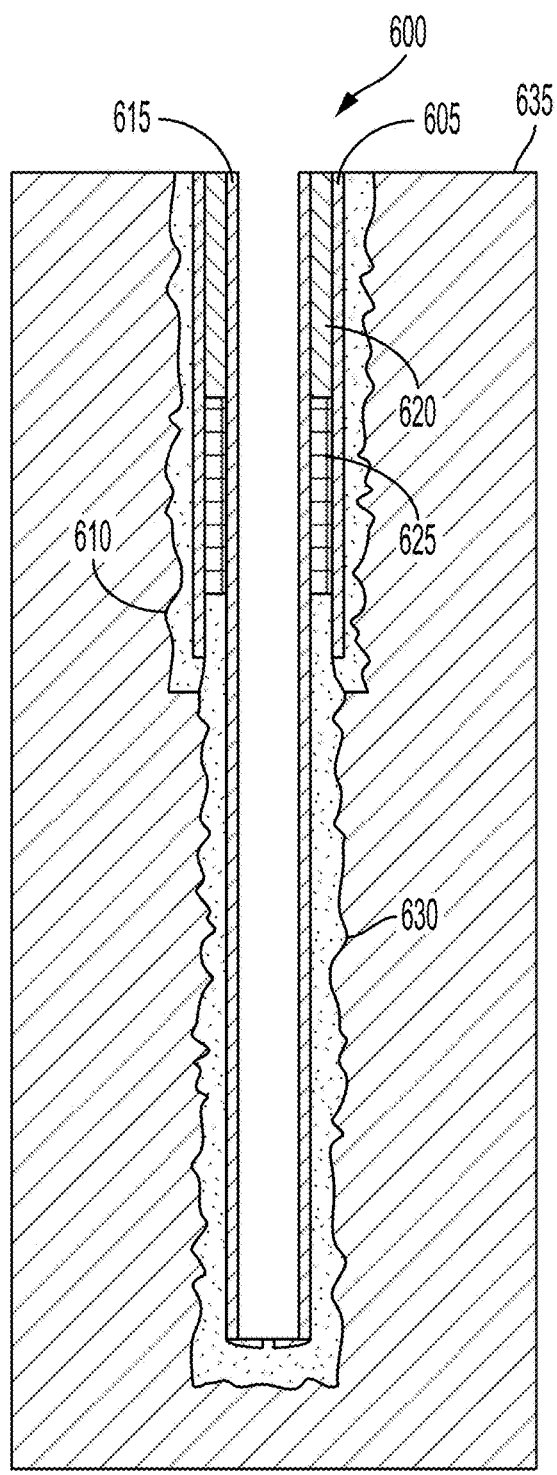
FIG. 6 is a schematic illustration of a wellbore completion operation for creating a detectable top of cement according to one example of the present disclosure.

FIG. 6 is a schematic illustration depicting a wellbore in which a metal barrier is to be formed at a downhole location in the wellbore to provide a casing collar. FIG. 6 shows a wellbore 600 with a first casing string 605, a first cement 610, a second casing string 615, drilling mud 620, mixture 625, and a second cement 630 in a formation 635. Here, mixture 625 comprises a suspension of a spacer fluid and particles of a metal material coated with a layer that is controllably activated. One or more wellbore operations are allowed to take place, providing time for particles of metal material in mixture 625 to settle on a top of second cement 630.

Figure 7:
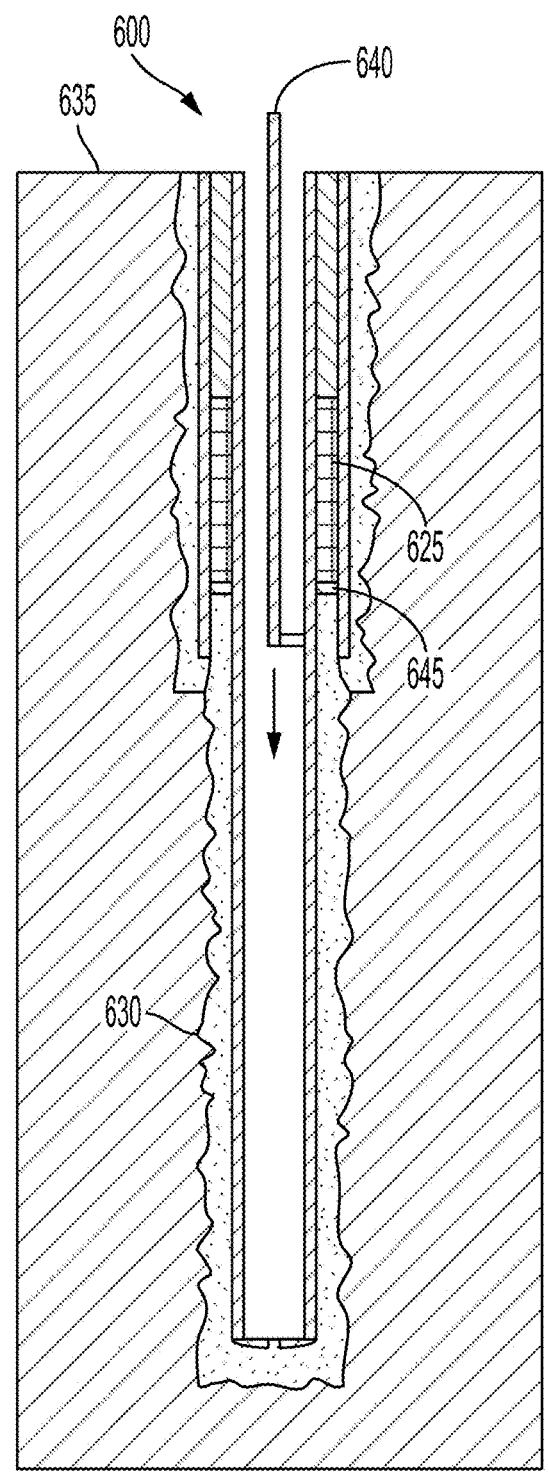
FIG. 7 is a schematic illustration of a wellbore having a casing collar providing a detectable top of cement according to one example of the present disclosure.

FIG. 7 is a schematic illustration depicting wellbore 600 in which a tool string 640 is passed in a downhole direction. Tool string 640 includes a device for activating the layer coating the metal material in mixture 625, such as a heater, electromagnet, or ultrasonic transducer. As tool string 640 passes the location of the top of second cement 630, the layer coating the metal material can be activated, releasing liquid metal material that can flow out from the layer and form a barrier 645 of solid metal material. Optionally, a weight of the metal material on itself as it settles can cause activation of the layer.

Figures 8, 9:
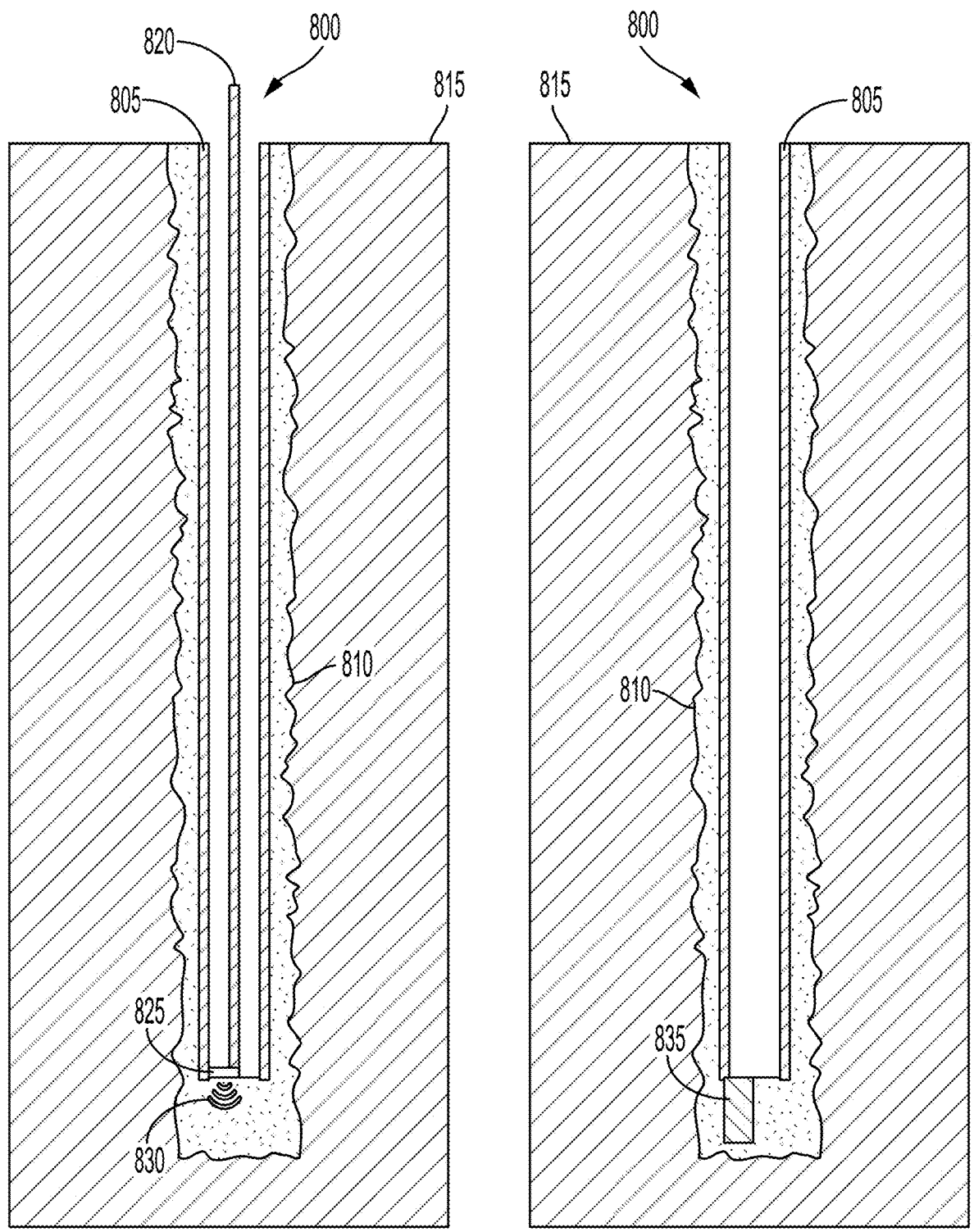
FIG. 8 is a schematic illustration of activation of a layer of a wellbore treatment mixture for creating a kickoff plug according to one example of the present disclosure.
FIG. 9 is a schematic illustration of a wellbore including a kickoff plug according to one example of the present disclosure.

FIG. 8 is a schematic illustration depicting a wellbore in which a metal barrier is to be formed at a downhole location in the wellbore to provide a kickoff plug. FIG. 8 shows a wellbore 800 with a casing string 805 and a mixture 810 in a formation 815. Here, mixture 810 comprises a wellbore treatment fluid, such as cement, and particles of a metal material coated with a layer that is controllably activated. One or more wellbore operations are allowed to take place after mixture 810 is positioned in the wellbore. A tool string 820 including an activation device is positioned at a downhole location. Here, activation device is depicted as an ultrasonic transducer 825, emitting ultrasonic waves 830 within mixture 810. The ultrasonic waves can activate the layer to release solid metal material. FIG. 9 is a schematic illustration depicting wellbore 800 after activation of the layer, showing a barrier 835 comprising solid metal material at a position to function as a kickoff plug to facilitate a subsequent drilling operation at an angle from wellbore 800.

Figure 10:
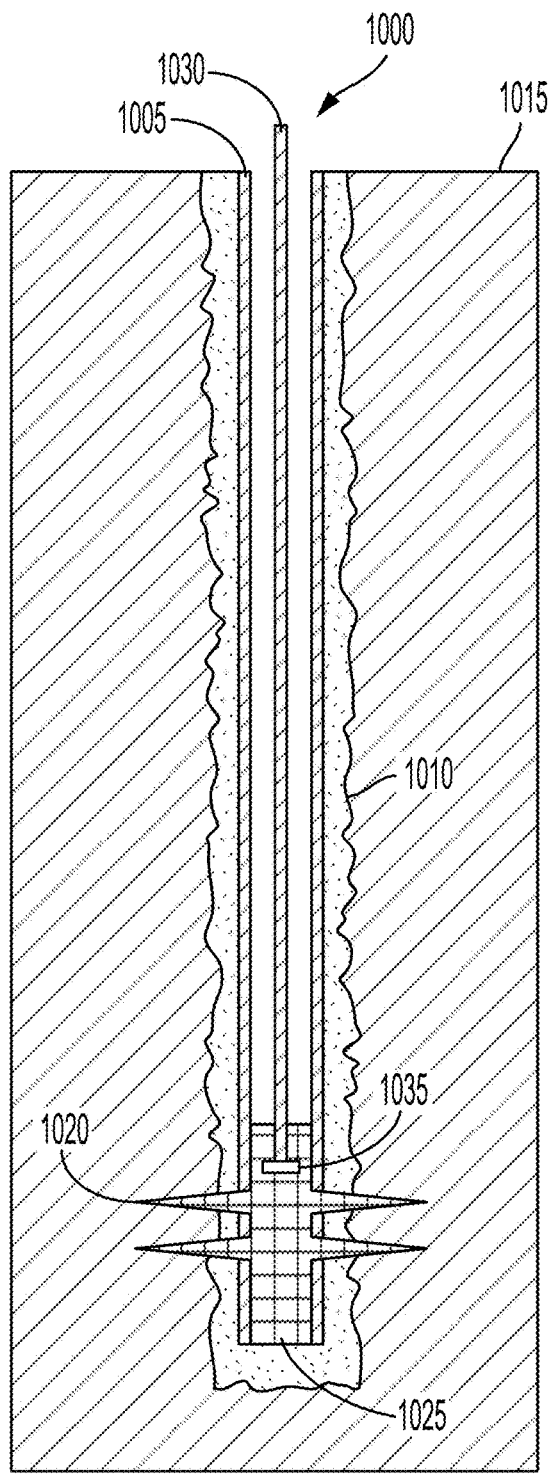
FIG. 10 is a schematic illustration of activation of a layer of a wellbore treatment mixture for creating a plug for a plug and abandon operation according to one example of the present disclosure.

FIG. 10 is a schematic illustration depicting a wellbore in which a metal barrier is to be formed at a downhole location in the wellbore to provide a solid metal plug for a plug and abandon application. FIG. 10 shows a wellbore 1000 with a casing string 1005 and a cement 1010 in a formation 1015. Wellbore 1000 also contains perforations 1020, which extend through the casing string 1005 and cement 1010 and into formation 1015. Here, a mixture 1025, comprising a metal material coated with a layer that is controllably activated, is positioned downhole in wellbore 1000 using tool string 1030. Tool string 1030 includes an activation device 1035, such as a heater, electromagnet, or ultrasonic transducer. One or more wellbore operations are allowed to take place after mixture 1025 is positioned in the wellbore, during which the mixture 1025 can flow into perforations 1020 and optionally into orifices within formation 1015 in fluid communication with perforations 1020. Although a packer or plug above or below mixture 1025 is not depicted in FIG. 10, packers or plugs can be optionally used for isolating mixture 1025 at a particular position within wellbore 1000, such as to provide a solid metal plug for sealing a zone in formation 1015 at a downhole position above the bottom of wellbore 1000, for example.

Figure 11:
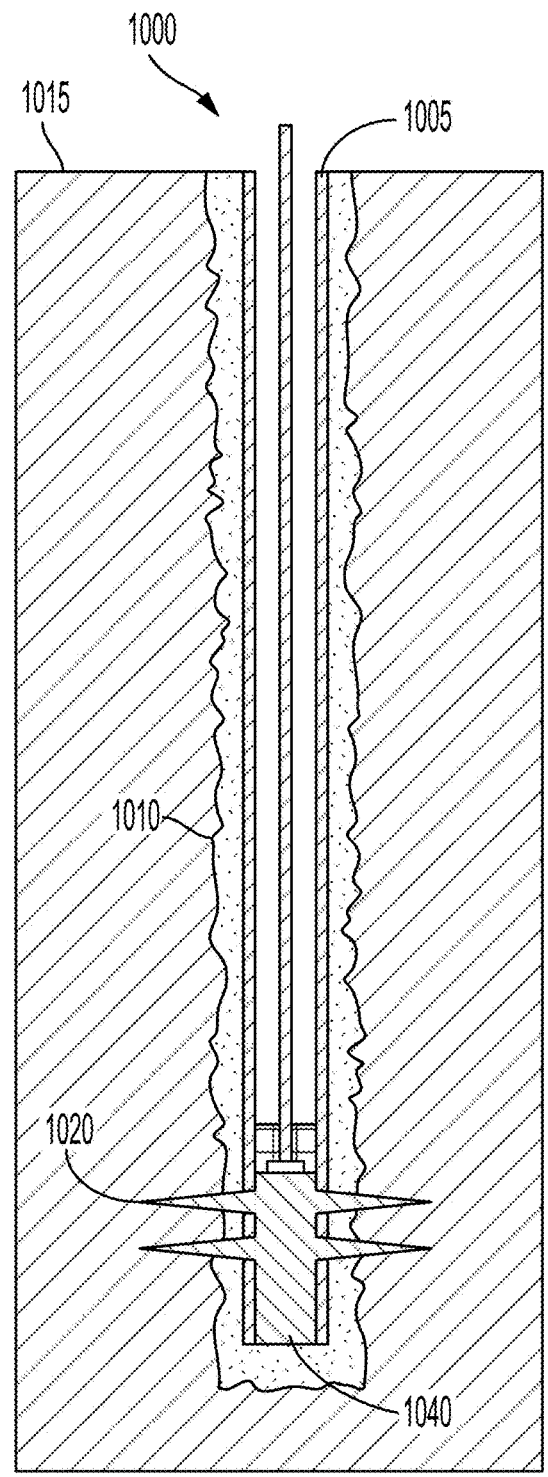
FIG. 11 is a schematic illustration of activation of a wellbore including a plug for a plug and abandon operation according to one example of the present disclosure.

The activation device 1035 can activate the layer of metal material in mixture 1025 to release the metal material in liquid form so it can flow out from the layer. FIG. 11 is a schematic illustration depicting wellbore 1000 after activation of the layer, showing the formation of a solid metal plug 1040 comprising solidified metal material from mixture 1025.

In some aspects, mixtures, methods, and materials for wellbore completion operations are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: positioning a metal material coated with a layer that is controllably activatable to release the metal material downhole in a wellbore; subsequent to performing a wellbore operation while the metal material is in the wellbore, activating the layer to release the metal material.

Example 2 is the method of example 1, wherein the metal material is in a liquid state prior to being released downhole in the wellbore, wherein activating the layer releases the metal material in the liquid state into the wellbore at which the metal material changes to a solid state to form a barrier, and wherein activating the layer comprises subjecting, at a downhole location, the layer to heat, ultrasonic energy, a magnetic field, an electric field, a compressive stress, a shear stress, or a chemical dissolution treatment.

Example 3 is the method of example 2, wherein the barrier comprises a shoe seal, a liner seal, a plug, a kickoff plug, a casing collar, or a casing anchor.

Example 4 is the method of examples 1-3, wherein the wellbore operation comprises at least one of running a casing into the wellbore, a cementing operation, a casing perforation operation, running production tubing into the wellbore, or a well stimulation operation.

Example 5 is the method of example 1-4, wherein positioning the metal material coated with the layer comprises positioning a mixture comprising the metal material coated with the layer suspended or dispersed in a fluid comprising cement, polymeric material, polymer precursor, or resin, and wherein the method further comprises curing the fluid prior to activating the layer.

Example 6 is the method of examples 1-5, wherein activating the layer is a temperature independent process.

Example 7 is the method of examples 1-6, wherein the metal material comprises particles of the metal material in an undercooled liquid state coated with the layer, wherein the layer comprises one or more of a metal oxide layer, an organic adlayer, an inorganic adlayer, or an organic functional group, and wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

Example 8 is a material comprising: a metal material; and a layer coating the metal material, the layer being controllably activatable in a wellbore to release the metal material subsequent to performing a wellbore operation.

Example 9 is the material of example 8, wherein the metal material is in a liquid state prior to activation of the layer, and wherein the layer is controllably activatable by subjecting, at a downhole location, the layer to heat, ultrasonic energy, a magnetic field, an electric field, a compressive stress, a shear stress, or a chemical dissolution treatment to release the metal material in the liquid state into the wellbore at which the metal material changes to a solid state to form a barrier.

Example 10 is the material of example 9, wherein the barrier comprises a shoe seal, a liner seal, a plug, a kickoff plug, a casing collar, or a casing anchor.

Example 11 is the material of examples 8-10, wherein the metal material and the layer suspendable or dispersable in a fluid comprising cement, polymeric material, polymer precursor, or resin, and wherein the fluid is cured or curable prior to activating the layer.

Example 12 is the material of examples 8-11, wherein the metal material comprises particles of the metal material in an undercooled liquid state coated with the layer, wherein the layer comprises one or more of a metal oxide layer, an organic adlayer, an inorganic adlayer, or an organic functional group, and wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

Example 13 is a mixture comprising: a fluid for performing a wellbore operation; and a metal material and a layer coating the metal material, the layer being controllably activatable in a wellbore to release the metal material subsequent to performing the wellbore operation.

Example 14 is the mixture of example 13, wherein the metal material comprises particles of the metal material coated with the layer, and wherein the particles are suspended or dispersed in the fluid.

Example 15 is the mixture of examples 13-14, wherein the fluid comprises cement, polymeric material, polymer precursor, or resin, and wherein the fluid is cured or curable prior to activating the layer.

Example 16 is the mixture of examples 13-15, wherein the metal material is in a liquid state prior to activation of the layer, and wherein the layer is controllably activatable by subjecting, at a downhole location, the layer to heat, ultrasonic energy, a magnetic field, an electric field, a compressive stress, a shear stress, or a chemical dissolution treatment to release the metal material in the liquid state into the wellbore at which the metal material changes to a solid state as a barrier, and wherein the barrier is positioned at a bottom of the wellbore, at an annulus between a casing and the wellbore, or at a top of cement.

Example 17 is the mixture of examples 16, wherein the barrier comprises a shoe seal, a liner seal, a plug, a kickoff plug, a casing collar, or a casing anchor.

Example 18 is the mixture of examples 13-17, wherein the wellbore operation comprises at least one of running a casing into the wellbore, a cementing operation, a casing perforation operation, running production tubing into the wellbore, or a well stimulation operation.

Example 19 is the mixture of examples 13-18, wherein the layer is controllably activatable by a temperature independent process.

Example 20 is the mixture of examples 13-19, wherein the metal material comprises particles of the metal material in an undercooled liquid state coated with the layer, wherein the layer comprises one or more of a metal oxide layer, an organic adlayer, an inorganic adlayer, or an organic functional group, and wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
applying particles downhole to a portion of a wellbore and prior to performing a wellbore operation, the particles comprising a metal material in an undercooled state coated with a layer that is controllably activatable to release the metal material in a liquid state in the wellbore;
performing the wellbore operation while the particles, which include the metal material in the undercooled state, are in the wellbore; and
subsequent to performing the wellbore operation, activating the layer to release the metal material in the liquid state from the particles, wherein the metal material in the liquid state flows and solidifies to form a barrier in the wellbore, the barrier comprising the metal material in a solid state.

2. The method of claim 1,
wherein activating the layer comprises subjecting, at a downhole location, the particles to heat, ultrasonic energy, a magnetic field, an electric field, a compressive stress, a shear stress, or a chemical dissolution treatment.

3. The method of claim 1, wherein the barrier comprises a shoe seal, a liner seal, a plug, a kickoff plug, a casing collar, or a casing anchor.

4. The method of claim 1, wherein the wellbore operation comprises at least one of running a casing into the wellbore, a cementing operation, a casing perforation operation, running production tubing into the wellbore, or a well stimulation operation.

5. The method of claim 1, wherein applying the particles comprises positioning a mixture comprising the particles suspended or dispersed in a fluid downhole to the portion of the wellbore.

6. The method of claim 5, wherein the fluid is a spacer fluid.

7. The method of claim 5, wherein the particles comprise from 5 wt. % to 95 wt. % of the mixture.

8. The method of claim 7, wherein the particles comprise from 10 wt. % to 40 wt. % of the mixture.

9. The method of claim 7, wherein the particles comprise from 60 wt. % to 90 wt. % of the mixture.

10. The method of claim 5, wherein the mixture has a specific gravity of from 3 to 12.

11. The method of claim 1, wherein activating the layer is a no-heat process.

12. The method of claim 1, wherein the layer comprises one or more of a metal oxide layer, an organic adlayer, an inorganic adlayer, or an organic functional group, and wherein the metal material comprises Field's metal, Wood's metal, Cerrosafe, Rose's metal, or an alloy or a eutectic alloy of one or more of bismuth, lead, tin, indium, cadmium, thallium, gallium, zinc, copper, silver, gold, or antimony.

13. The method of claim 1, wherein the wellbore operation comprises a completion operation.

14. The method of claim 1, further comprising allowing the particles to settle by gravity while performing the wellbore operation to form a layer of settled particles.

15. The method of claim 14, wherein the layer of settled particles is positioned at a top of a cement, and wherein activating the layer forms the barrier comprising a casing collar at the top of the cement.

16. The method of claim 1, wherein the metal material expands upon solidifying.

17. The method of claim 1, further comprising positioning an activation tool downhole in the wellbore for activating the layer, and wherein activating the layer comprises using the activation tool.

18. The method of claim 17, wherein the activation tool comprises one or more of an ultrasonic transducer, a heater, or an electromagnet.

19. The method of claim 1, further comprising locating a position of the barrier in the wellbore.

20. The method of claim 19, wherein locating the position of the barrier comprises using a wireline tool downhole in the wellbore.

* * * * *